Nov. 22, 1949 W. J. VAN HEECKEREN 2,488,784
DEVICE FOR PASSING A ROTARY SHAFT THROUGH
A WALL IN A GASTIGHT MANNER
Filed Sept. 13, 1945
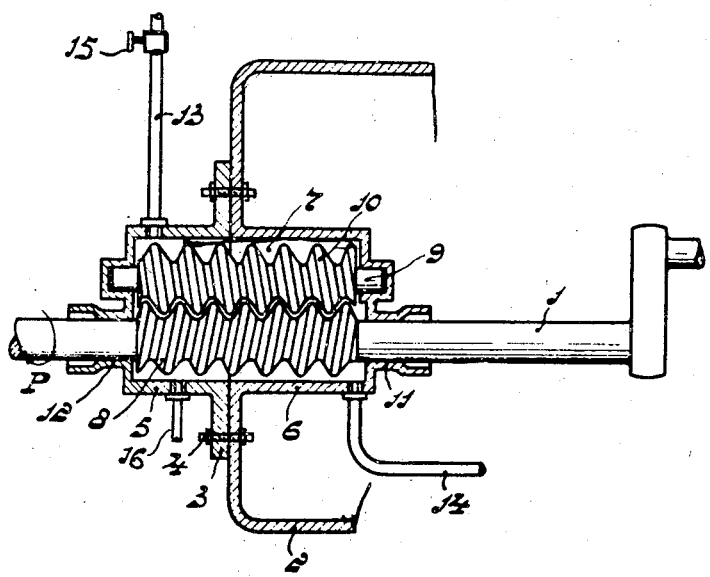
INVENTOR.
WILLEM JAN VAN HEECKEREN
BY Fred M Vogel
AGENT Patented Nov. 22, 1949

2,488,784

UNITED STATES PATENT OFFICE 2,488,784

DEVICE FOR PASSING A ROTARY SHAFT THROUGH A WALL IN A GASTIGHT MANNER

Willem Jan van Heeckeren, Eindhoven, Netherlands, assignor to Hartford National Bank & Trust Co., Hartford, Conn., as trustee Application September 13, 1945, Serial No. 616,096
In Belgium March 3, 1945

2 Claims. (Cl. 103—7)

Various constructions of devices for passing a rotary shaft through a wall in a gas-tight manner are known. As a rule the common constructions have the drawback of either being rather complicated or steadily requiring expert supervision and repeated readjustment due to wear and tear.

The present invention has for its purpose to provide a device which is structurally simple and practically not requiring supervision. In addition, the device for leading a rotary shaft through a wall in a gas-tight manner according to the present invention yields other advantages which will be set out hereinafter.

The device according to the invention is characterized by a screw thread on the shaft to be passed through a wall in a gas-tight manner and by a screw thread, which meshes with the first-mentioned screw thread, on a separate shaft which preferably extends parallel with the first-mentioned shaft, both screw threads being surrounded by a liquid-filled housing which is connected in a gas-tight manner to the said wall. Upon rotation of the main shaft the auxiliary shaft will follow its rotation on account of the meshing screw threads. These two screw threads constitute a feeding device for the liquid enclosed in the housing so that at one end of this housing the liquid pressure is higher than at the other end. The value of this pressure difference depends on the viscosity of the liquid, the speed of the shaft and the value of the screw pitch. If the end of the housing where the higher liquid pressure prevails is at the side of the wall where the higher gas pressure prevails, the liquid pressure prevents the gas from leaking away through this housing.

Besides for obturation purposes the shaft obturation according to the present invention may also be used as a pump to force a liquid into the chamber having a higher gas-pressure. In one embodiment of the invention the shaft-obturation is used for a closed driving gear case of an apparatus. The housing surrounding the screw threads is filled with liquid e. g. oil and in conjunction with the speed of the driving gear shaft the pitch of the screw thread is chosen in such a manner that the highest pressure of the lubricating oil in this housing exceeds the gas-pressure within this case. In this way the lubricating oil is forced into the case.

This form of construction of the invention may also be used to constitute a pump for gaseous media, by introducing gas into the obturation housing at a point of low liquid pressure. This gas is carried with the circulated liquid and likewise given a higher pressure. This form of construction is of importance for thermo-dynamic apparatus having a closed cycle and a closed crank case such as, for instance, a hot-gas engine of this kind. The gas pumped into the crank case then flows periodically or permanently to the cylinder room where it is taken up in a cycle.

The invention will be more fully explained with reference to the accompanying drawing, given by way of example.

This drawing represents diagrammatically the crank shaft 1 of a hot-gas engine which is housed in the entirely closed crank case 2 (partly represented in the drawing). The case 5 is secured to the housing 2 by means of a flange 3 and bolt and nut joints 4; together with the re-entrant part 6 of the crank case it forms a chamber 7. This chamber contains the worm threaded part 8 of the shaft 1. Furthermore this case contains the auxiliary shaft 9 which is furnished with a screw thread 10. The screw threads 8 and 10 engage each other. The space of the chamber 7 is completely filled with a liquid e. g. oil. Upon rotation of the shaft 1 in the direction of the arrow P the oil starts circulating in the chamber. Supposing that the pressure prevailing in the crank case exceeds the pressure on the exterior of the crank case, so that in general the gases in the crank case would tend to escape from the crank case, any leakage gases which would try to escape to the outside e. g. through the obturations 11 and 12, will be pumped back by the circulating oil, thus obtaining by very simple means a gas-tight lead-through of the rotary shaft 1 through the wall of the crank case 2.

In hot-gas engines having a closed cycle it is sometimes desirable to feed a gaseous medium to the engine during its operation e. g. for the replenishment of the gas contents of the engine, which always decreases on account of a leakage loss during operation, or for raising the pressure level in the engine with a view to increasing its power. By equipping the represented device with a gas supply pipe 13 at one side and a gas discharge pipe 14 at the other side the obturation of the shaft may at the same time act as a gas pump. The gas, e. g. air, which is aspirated by the pipe 13 is forced, by the oil contained in the chamber 7, to the right-hand part of the chamber 7 and is allowed to enter the crank-case 2 through the pipe 14. Of course, the pipe 13 will be furnished with a control device e. g. a cock 15 which permits the quantity of air pumped into the engine to be adjusted at will. An oil pipe 16 is provided for replenishing the supply of oil to the housing.

While I have shown and described a particular embodiment of the invention it is apparent that changes in form can be made without seriously departing from the spirit of the invention.

What I claim is:

1. Apparatus for the gas-tight sealing of a rotatable shaft protruding from a container in which a pressured fluid may be confined, said apparatus comprising a housing enclosing a portion of said shaft and containing a fluid medium, a wall portion of said housing secured to a wall portion of said container in a gas-tight manner, said rotatable shaft protruding through said housing wall to the exterior of said housing and through said container wall into the interior of said container, a first screw thread member forming part of said portion of said shaft enclosed within said housing, a second and rotatable screw thread member positioned within said housing and located substantially parallel to and threadedly engaging said first screw thread member and arranged to move said fluid toward the region of protrusion of said shaft through said container wall, fluid supply means connected into said wall portion of said housing and fluid discharge means coupled into said container wall portion and opening into said container.

2. Apparatus for the gas-tight sealing of a rotatable shaft protruding from a container in which a pressured fluid may be confined, said apparatus comprising a housing enclosing a portion of said shaft and containing a fluid medium, a wall portion of said housing secured to a wall portion of said container in a gas-tight manner, said rotatable shaft protruding through said housing wall to the exterior of said housing and through said container wall into the interior of said container, a first screw thread member forming part of said portion of said shaft enclosed within said housing, a second and rotatable screw threaded member positioned within said housing and located parallel to and threadedly engaging said first screw thread member, the screw threads of said first and second members having a helical angle and arranged to move said fluid toward the region of protrusion of said shaft through said container wall, fluid supply means connected into said wall portion of said housing and fluid discharge means coupled into said container wall portion and opening into said container, and an oil supply pipe opening into said housing.

WILLEM JAN van HEECKEREN.

REFERENCES CITED

The following references are of record in the file of this patent:

UNITED STATES PATENTS

| Number | Name | Date |
|---|---|---|
| 959,533 | Holst | May 31, 1910 |
| 1,119,972 | Machlet | Dec. 8, 1914 |
| 1,669,050 | Grant | May 8, 1928 |
| 1,770,496 | Lawaczeck | July 15, 1930 |
| 1,821,523 | Montelius | Sept. 1, 1931 |
| 2,135,247 | Aikman | Nov. 1, 1938 |

FOREIGN PATENTS

| Number | Country | Date |
|---|---|---|
| 438,582 | Germany | 1926 |
| 517,671 | Germany | Dec. 22, 1928 |